Figure 1:
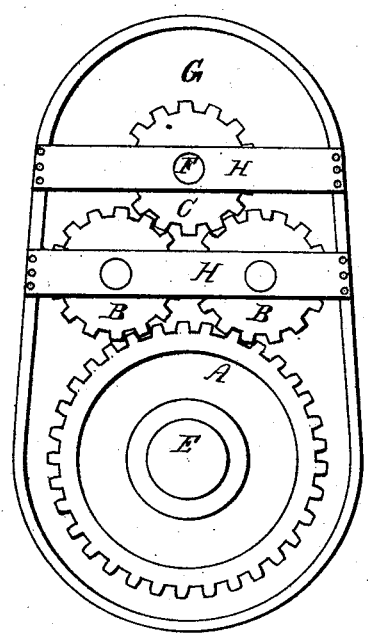
Figure 2:
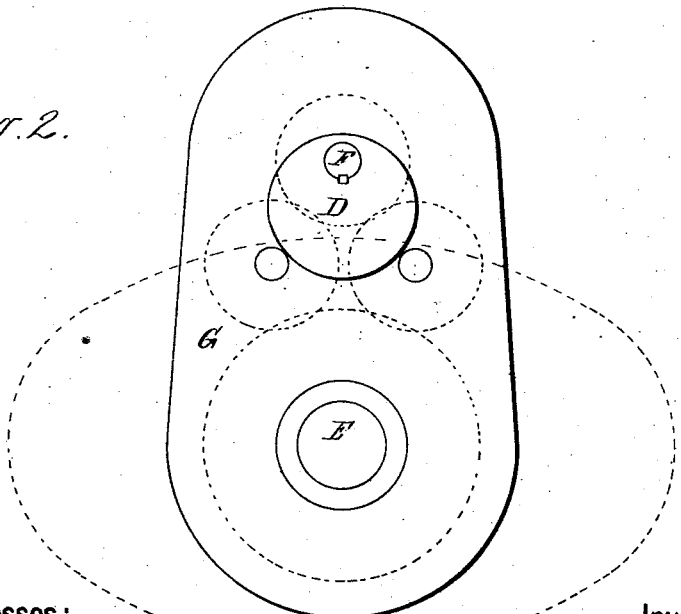

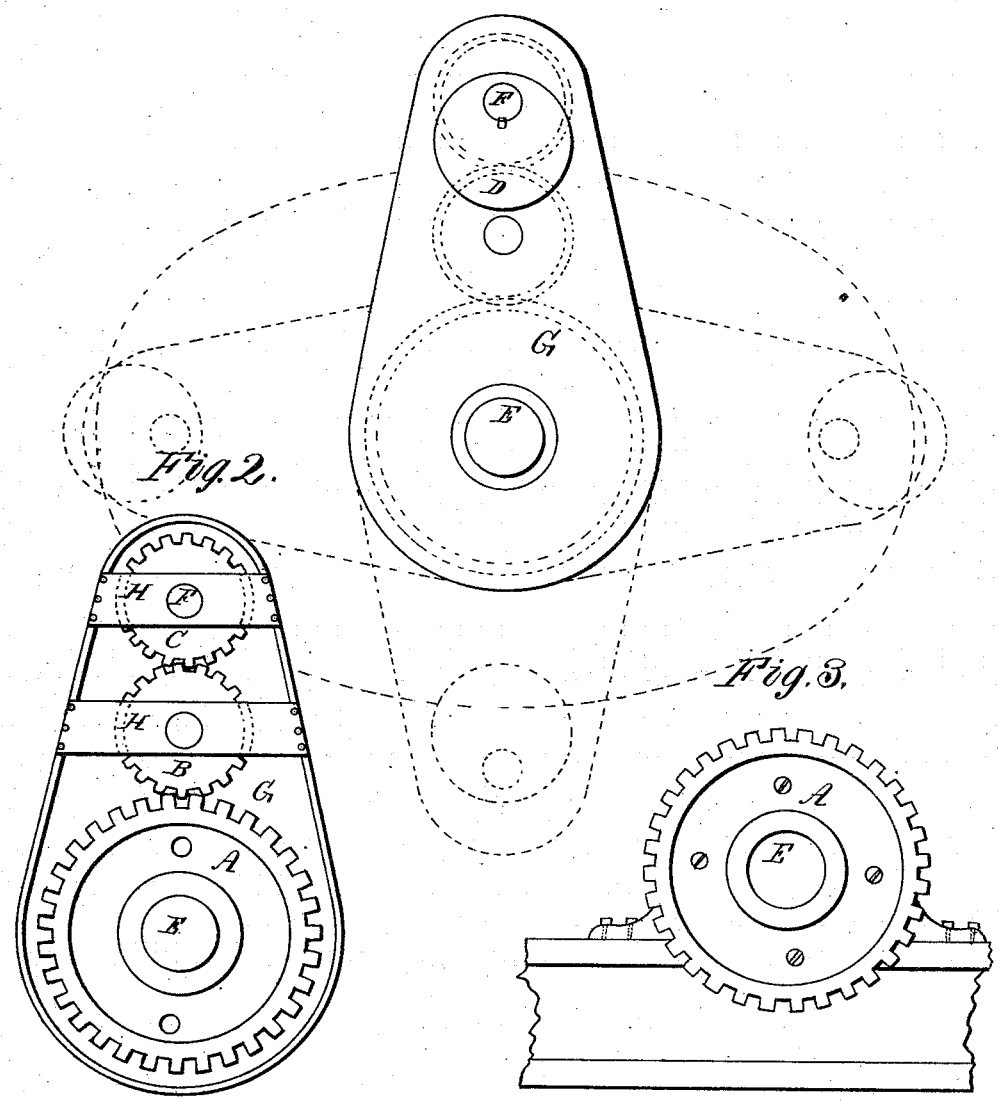

2 Sheets--Sheet 2.

W. M. BOGGS.
Engine-Cranks.

No. 157,147. Patented Nov. 24, 1874.

Witnesses:
R. J. Fleming
Mary D. Poor

Inventor:
William M. Boggs

UNITED STATES PATENT OFFICE.

WILLIAM M. BOGGS, OF MONONGAHELA CITY, ASSIGNOR OF ONE-HALF HIS RIGHT TO JOHN CUNINGHAM BOGGS, OF ROCKVILLE, PENNSYLVANIA.

IMPROVEMENT IN ENGINE-CRANKS.

Specification forming part of Letters Patent No. 157,147, dated November 24, 1874; application filed January 27, 1874.

*To all whom it may concern:*

Be it known that I, WILLIAM MARSHALL BOGGS, of Monongahela City, county of Washington, State of Pennsylvania, have invented an Improved Engine-Crank.

The object of my invention is to improve the engine-crank now in use, and increase its efficiency by giving to the driving-rod or pitman an elliptical instead of a circular motion; and I do hereby declare that the following is a full, clear, and exact description thereof, which will enable others skilled in the art to make and use the same, reference being had to the accompanying drawings, in which—

Plate 1 represents the crank with a gear of three wheels. Plate 2 represents the crank with a gear of four wheels. Either of these gears may be used, and the following description of my invention applies to both or either of them.

First, the cog-wheel A, which is cast in halves with, or fastened on the face of, the main shaft-box, or the bed of the engine, or both, through which the main shaft E revolves. Wheel A, being stationary, is used simply to give motion to the other parts of the gear as they revolve around it.

Second, the cog-wheels (or wheel) B, which are pivoted between the crank G and strap H, and have cogs similar to those on wheel A. Wheels (or wheel) B gear with wheels A and C, and are used to transmit proper motion and speed to wheel C.

Third, the cog-wheel C, which is keyed, or otherwise fastened, to the end of the small shaft F, between the crank G and strap H, on the same side of the crank as A and B. Wheel C contains one-half as many cogs as wheel A, and makes exactly two revolutions in going arounds its circumference. This cog-wheel is used to give proper motion and speed to the eccentric D by means of the small shaft F.

Fourth, the eccentric D, which is fastened to the opposite end of the small shaft F (and on the opposite side of the crank) to the wheel C, and to which the driving-rod or pitman is attached. This eccentric is used, in conjunction with the other parts of the gear, to give to the end of the driving-rod an elliptical motion.

Fifth, the crank or disk G, which is pierced for the reception of the axis of the wheels (or wheel) B and the small shaft F, and in which they revolve. The crank has a rim cast or swelled on its circumference; this rim forming a bed, in which the cog-wheels lie, and also a support for the straps H.

Sixth, the small shaft F, which revolves in and through the crank G, and upon the ends of which the cog-wheel C and the eccentric D are keyed or otherwise firmly fastened. This shaft is used to convey motion to the eccentric D from the wheel C. Friction-rollers may be inserted between the eccentric and the crank to steady its motion, if thought advisable.

Seventh, the straps H, which are pierced and properly fitted for receiving the journals of the wheels or wheel B and the small shaft F. These straps are used to strengthen, steady, and, in part, sustain the gearing under them.

By this gear the eccentric D is compelled to make exactly two revolutions while the crank G makes one. Or, in other words, the eccentric completes one-half of a revolution just as the crank completes one-fourth of a revolution, as shown in plate 1 of the drawings, which gives the four positions of the eccentric in dotted lines. Thus the end of the driving-rod in which the eccentric revolves is made to describe an ellipsis instead of a circle. The dotted-line ellipsis in the drawings shows about the travel of the driving-rod. The advantages to be derived from this motion are obvious, and will present themselves at a glance from an eye skilled in mechanics. Among the number I might mention, a more direct, and therefore more powerful, line of motion or force; less friction, as the eccentric is constantly receding from the power exerted, and helping, through its gear, to make the revolution easier; the ability of the engine to work and use the steam supplied up to almost the point where the stroke ends, thereby getting the full force of the expansive force of the steam.

I do not claim to have invented either cranks, cog-wheel gears, or eccentrics, for I know they have been long in use.

I am aware that the eccentric D can be made larger or smaller and not be in proportion to the one shown in the drawing accompanying this application. And I am aware that the wheels A, B, and C, and the eccentric D, can be made with spokes, instead of being cast solid. I am also aware that the wheel A can be made in two parts, either separate from, or forming parts of, the pedestal or bed and main-shaft box-cover. I am also aware that the smaller part of the crank can be cast hollow, or made of two or more parts, thus inclosing the wheels B and C; and also that the axis of the wheels B and C may be inclosed in boxes, said boxes being fastened on or in the edges of a hollow, or partially hollow, crank; all of which changes may be made without affecting the principal operation.

What I claim, therefore, broadly, is—

The combination of an eccentric, D, small shaft F, and gear-wheels C, B, and A, with a crank, substantially as shown and described, for the purpose set forth.

The above claim and specification of my invention signed by me this 24th day of January, 1874.

WILLIAM MARSHALL BOGGS.

Witnesses:
 JOS. T. K. PLANT,
 S. I. SHANKS.